(12) United States Patent
Uneura et al.

(10) Patent No.: US 11,719,125 B2
(45) Date of Patent: Aug. 8, 2023

(54) MULTI-LOBE BEARING AND TURBOCHARGER

(71) Applicant: IHI Corporation, Tokyo (JP)

(72) Inventors: Yutaka Uneura, Tokyo (JP); Shunsuke Nishii, Tokyo (JP); Hiroki Mochizuki, Tokyo (JP)

(73) Assignee: IHI Corporation, Tokyo (JP)

(*) Notice: Subject to any disclaimer, the term of this patent is extended or adjusted under 35 U.S.C. 154(b) by 0 days.

(21) Appl. No.: 17/646,416

(22) Filed: Dec. 29, 2021

(65) Prior Publication Data
US 2022/0120194 A1    Apr. 21, 2022

Related U.S. Application Data

(63) Continuation of application No. PCT/JP2020/032066, filed on Aug. 25, 2020.

(30) Foreign Application Priority Data

Oct. 18, 2019    (JP) .................................. 2019-191259

(51) Int. Cl.
*F01D 25/16*        (2006.01)
*F01D 25/18*        (2006.01)
(Continued)

(52) U.S. Cl.
CPC ........... *F01D 25/166* (2013.01); *F01D 25/18* (2013.01); *F16C 17/10* (2013.01); *F16C 33/02* (2013.01);
(Continued)

(58) Field of Classification Search
CPC ........ F01D 25/166; F01D 25/18; F02B 39/00; F05D 2220/40; F05D 2240/52;
(Continued)

(56) References Cited

U.S. PATENT DOCUMENTS 6,402,385 B1 *   6/2002   Hayakawa ............ F16C 17/028
                                                                   384/114
8,790,066 B2 *   7/2014   Gutknecht .......... F16C 33/1075
                                                                   415/111
(Continued)

FOREIGN PATENT DOCUMENTS

JP    2007-192325 A    8/2007
JP       4937588 B2    5/2012
(Continued)

OTHER PUBLICATIONS

International Search Report dated Oct. 27, 2020 in PCT/JP2020/032066, filed on Aug. 25, 2020 citing documents AA & AQ-AS therein, 2 pages.

*Primary Examiner* — Jesse S Bogue
(74) *Attorney, Agent, or Firm* — Oblon, McClelland, Maier & Neustadt, L.L.P.

(57) ABSTRACT

A semi-floating bearing (multi-lobe bearing) includes a radial bearing surface that is formed on an inner circumferential surface of a body, and that includes a plurality of arcuate surfaces having mutually different centers of curvature and arranged adjacent to each other in a circumferential direction of the body; and axial grooves formed on the radial bearing surface and extending in an axial direction of the shaft, a center position of the axial groove in the circumferential direction being located at a position spaced apart rearwardly from a boundary portion between the plurality of arcuate surfaces in the circumferential direction of the shaft within an area from the boundary portion to a central position of the arcuate surfaces in the circumferential direction.

9 Claims, 8 Drawing Sheets

(51) Int. Cl.
  *F16C 17/10* (2006.01)
  *F16C 33/02* (2006.01)
(52) U.S. Cl.
  CPC ...... *F05D 2220/40* (2013.01); *F05D 2240/52* (2013.01); *F05D 2240/54* (2013.01); *F05D 2260/98* (2013.01)
(58) Field of Classification Search
  CPC ............ F05D 2240/54; F05D 2260/98; F16C 17/028; F16C 17/10; F16C 17/18; F16C 2360/24; F16C 33/02; F16C 33/1065; F16C 33/107
  See application file for complete search history.

(56) References Cited

U.S. PATENT DOCUMENTS

| | | | |
|---|---|---|---|
| 9,279,453 B2* | 3/2016 | Laubender | F16C 33/103 |
| 11,187,236 B2* | 11/2021 | Jaenike | F02B 37/00 |
| 11,280,372 B2* | 3/2022 | Ueda | F02B 39/00 |
| 11,319,835 B2* | 5/2022 | Injac | F16C 33/1065 |
| 2010/0092115 A1* | 4/2010 | Wendling | F16C 17/028 |
| | | | 384/99 |
| 2018/0128163 A1* | 5/2018 | Ueda | F16C 17/10 |

FOREIGN PATENT DOCUMENTS

| | | |
|---|---|---|
| JP | 2019-65934 A | 4/2019 |
| WO | WO 2017/010450 A1 | 1/2017 |
| WO | WO 2017/203880 A1 | 11/2017 |

* cited by examiner

MULTI-LOBE BEARING AND TURBOCHARGER

CROSS REFERENCE TO RELATED APPLICATIONS

This application is a continuation application of International Application No. PCT/JP2020/032066, filed on Aug. 25, 2020, which claims priority to Japanese Patent Application No. 2019-191259 filed on Oct. 18, 2019, the entire contents of which are incorporated herein by reference.

BACKGROUND ART

Technical Field

The present disclosure relates to a multi-lobe bearing and a turbocharger.

Patent Literature 1 discloses a multi-lobe bearing including three arcuate surfaces and three axial grooves. The multi-lobe bearing supports a shaft. The three arcuate surfaces are formed in a region that serves as a radial bearing surface of the multi-lobe bearing. The three axial grooves are formed at the boundaries of the three arcuate surfaces.

CITATION LIST

Patent Literature

Patent Literature 1: JP 4937588 B

SUMMARY

Technical Problem

Lubricant flows through the axial grooves. The axial grooves supply the lubricant to the radial bearing surface (the arcuate surfaces). However, a pressure of the lubricant in the axial grooves increases as the shaft rotates faster. When the pressure of the lubricant in the axial grooves increases, it is difficult for the lubricant to flow through the axial grooves.

An object of the present disclosure is to provide a multi-lobe bearing and a turbocharger in which lubricant can easily flow through an axial groove.

Solution to Problem

To solve the above problem, a multi-lobe bearing of the present disclosure includes: an annular body through which a shaft is inserted; a radial bearing surface that is formed on an inner circumferential surface of the body, and that includes a plurality of arcuate surfaces including mutually different centers of curvature and arranged adjacent to each other in a circumferential direction of the body; and axial grooves formed in the radial bearing surface and extending in an axial direction of the shaft, a center position of the axial groove in the circumferential direction being located at a position spaced apart rearwardly from a boundary portion between the plurality of arcuate surfaces in a rotational direction of the shaft within an area from the boundary portion to a central position of the arcuate surface in the circumferential direction.

The axial groove may be spaced apart from the central position and the boundary portion.

The radial bearing surface may include four arcuate surfaces, and the center position of the axial groove may be formed within an area that is less than 22.5 degrees from the boundary portion rearwardly in a rotational angle in the rotational direction.

The axial groove may include a forward face formed at a position forward in the rotational direction of the shaft, and a rearward face formed at a position rearward in the rotational direction, and an angle between a tangent of the forward face at an edge continuous with the arcuate surface and an imaginary surface of the arcuate surface extended inwardly in the axial groove may be smaller than an angle between a tangent of the rearward face at an edge continuous with the arcuate surface and the imaginary surface.

The multi-lobe bearing may include a thrust bearing surface formed on an end face of the body in the axial direction, wherein the axial groove is opened on the thrust bearing surface.

In order to solve the above problem, a turbocharger of the present disclosure comprises the above-described multi-lobe bearing.

Effects of Disclosure

According to the present disclosure, the lubricant can easily flow through the axial groove.

DESCRIPTION OF EMBODIMENTS

Embodiments of the present disclosure will be described in detail below with reference to the accompanying drawings. Specific dimensions, materials, and numerical values described in the embodiments are merely examples for a better understanding, and do not limit the present disclosure unless otherwise specified. In this specification and the drawings, duplicate explanations are omitted for elements having substantially the same functions and configurations by assigning the same sign. Furthermore, elements not directly related to the present disclosure are omitted from the FIG.s.

Figure 1:
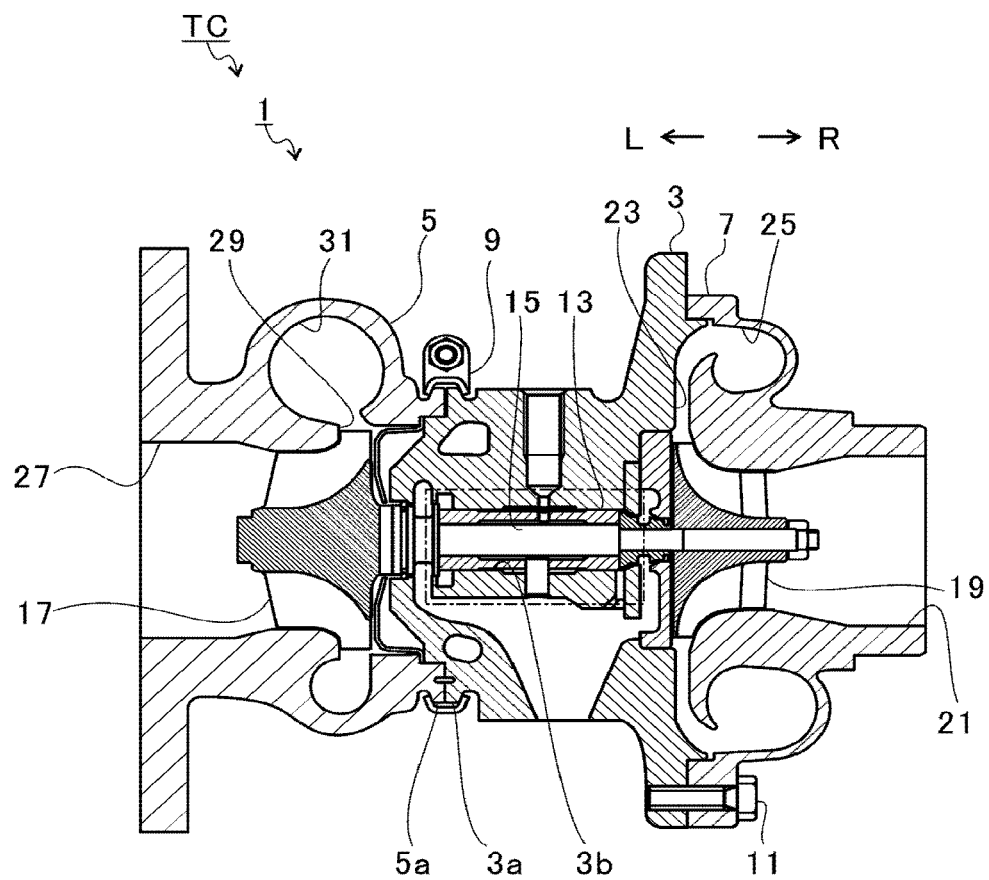
FIG. 1 is a schematic cross-sectional view of a turbocharger.

FIG. 1 is a schematic cross-sectional view of a turbocharger TC. Hereinafter, a direction indicated by an arrow L in FIG. 1 is described as the left side of the turbocharger TC. A direction indicated by an arrow R in FIG. 1 is described as the right side of the turbocharger TC. As shown in FIG. 1, the turbocharger TC comprises a turbocharger body 1. The turbocharger body 1 includes a bearing housing 3, a turbine housing 5, and a compressor housing 7. The turbine housing 5 is connected to the left side of the bearing housing 3 by a fastening mechanism 9. The compressor housing 7 is connected to the right side of the bearing housing 3 by fastening bolts 11.

A projection 3a is provided on an outer circumferential surface of the bearing housing 3. The projection 3a is provided closer to the turbine housing 5. The projection 3a protrudes in a radial direction of the bearing housing 3. A projection 5a is provided on an outer circumferential surface of the turbine housing 5. The projection 5a is provided closer to the bearing housing 3. The projection 5a protrudes in a radial direction of the turbine housing 5. The bearing housing 3 and the turbine housing 5 are banded together by the fastening mechanism 9. The fastening mechanism 9 comprises, for example, a G-coupling. The fastening mechanism 9 holds the projections 3a and 5a.

A bearing hole 3b is formed in the bearing housing 3. The bearing hole 3b passes through in the left-to-right direction of the turbocharger TC. A semi-floating bearing 13 is arranged in the bearing hole 3b. The semi-floating bearing 13 rotatably supports a shaft 15. A turbine impeller 17 is provided at the left end of the shaft 15. The turbine impeller 17 is rotatably accommodated in the turbine housing 5. A compressor impeller 19 is provided at the right end of the shaft 15. The compressor impeller 19 is rotatably accommodated in the compressor housing 7.

An inlet 21 is formed in the compressor housing 7. The intake 21 opens to the right side of the turbocharger TC. The inlet 21 is connected to an air cleaner (not shown). A diffuser flow path 23 is formed by opposing surfaces of the bearing housing 3 and the compressor housing 7. The diffuser flow path 23 pressurizes air. The diffuser flow path 23 is formed in an annular shape. The diffuser flow path 23 is connected to the inlet 21 via the compressor impeller 19 at a radially inner side.

A compressor scroll flow path 25 is formed in the compressor housing 7. The compressor scroll flow path 25 is formed in an annular shape. The compressor scroll flow path 25 is, for example, located outside the diffuser flow path 23 in a radial direction of the shaft 15. The compressor scroll flow path 25 is connected to an intake port of an engine (not shown) and to the diffuser flow path 23. When the compressor impeller 19 rotates, air is sucked into the compressor housing 7 from the inlet 21. The intake air is pressurized and accelerated while passing through blades of the compressor impeller 19. The pressurized and accelerated air is pressurized in the diffuser flow path 23 and the compressor scroll flow path 25. The pressurized air is led to the intake port of the engine.

An outlet 27 is formed in the turbine housing 5. The outlet 27 opens to the left side of the turbocharger TC. The outlet 27 is connected to an exhaust gas purifying device (not shown). A connecting flow path 29 and a turbine scroll flow path 31 are formed in the turbine housing 5. The turbine scroll flow path 31 is formed in an annular shape. The turbine scroll flow path 31 is, for example, located outside the connecting flow path 29 in a radial direction of the turbine impeller 17. The turbine scroll flow path 31 is connected to a gas inlet (not shown). Exhaust gas discharged from an exhaust manifold of the engine (not shown) is led to the gas inlet. The connecting flow path 29 connects the turbine scroll flow path 31 with the outlet 27 via the turbine impeller 17. The exhaust gas led from the gas inlet to the turbine scroll flow path 31 is led to the outlet 27 via the connecting flow path 29 and the turbine impeller 17. The exhaust gas led to the outlet 27 rotates the turbine impeller 17 while processing therethrough.

The rotational force of the turbine impeller 17 is transmitted to the compressor impeller 19 via the shaft 15. When the compressor impeller 19 rotates, the air is pressurized as described above. In this manner, the air is led to the intake port of the engine.

Figure 2:
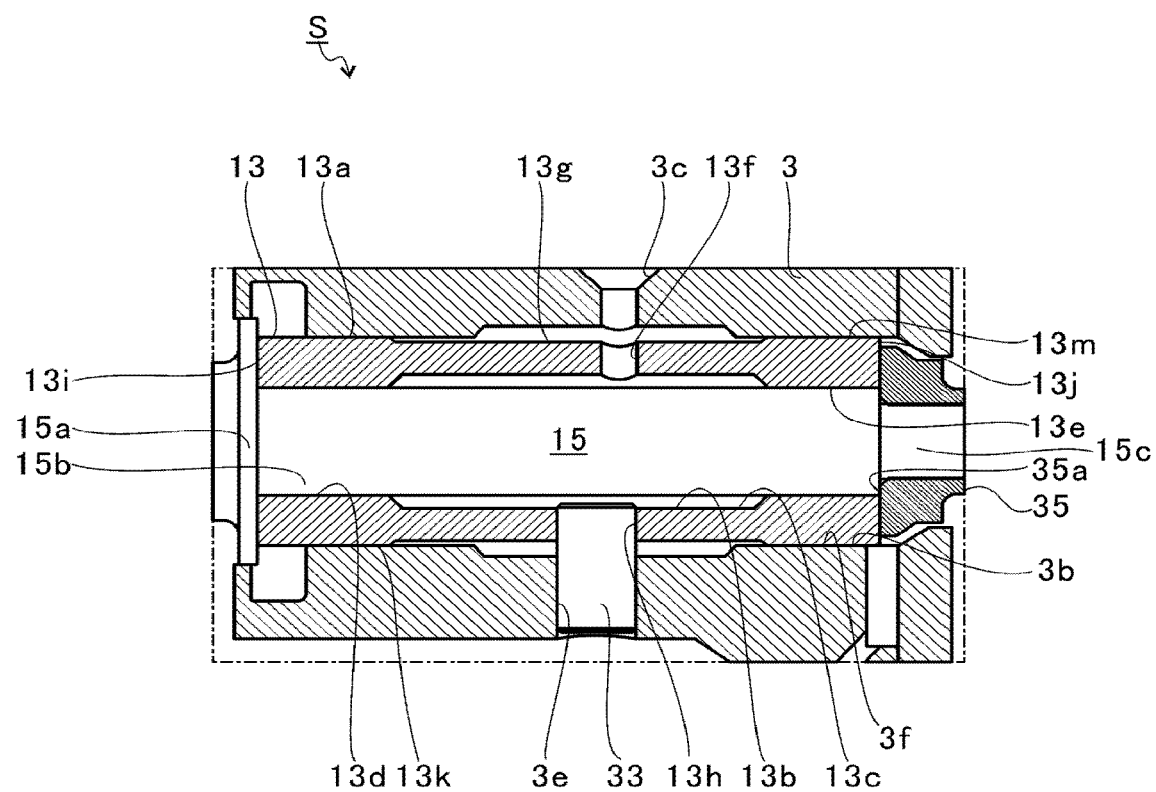
FIG. 2 is an extraction of an area enclosed by dashed dotted lines in FIG. 1.

FIG. 2 is an extraction of an area enclosed by dashed dotted lines in FIG. 1. As shown in FIG. 2, a bearing structure S is provided inside the bearing housing 3. The bearing structure S includes the bearing hole 3b, the semi-floating bearing 13, and the shaft 15.

An oil path 3c is formed in the bearing housing 3. Lubricant is supplied to the oil path 3c. The oil path 3c opens (is connected) to the bearing hole 3b. The oil path 3c leads the lubricant to the bearing hole 3b. The lubricant flows from the oil path 3c into the bearing hole 3b.

The semi-floating bearing 13 is disposed in the bearing hole 3b. The semi-floating bearing 13 includes an annular body 13a. An insertion hole 13b is formed in the body 13a. The insertion hole 13b penetrates the body 13a in an axial direction of the shaft 15 (hereinafter simply referred to as the axial direction). The shaft 15 is inserted into the insertion hole 13b.

Two radial bearing surfaces 13d and 13e are formed on an inner circumferential surface 13c of the body 13a (insertion hole 13b). The two radial bearing surfaces 13d and 13e are arranged spaced apart from each other in the axial direction. An oil hole 13f is formed in the body 13a. The oil hole 13f penetrates the body 13a from the inner circumferential surface 13c to an outer circumferential surface 13g. The oil hole 13f is disposed between the two radial bearing surfaces 13d and 13e. The oil hole 13f faces an opening of the oil path 3c in a radial direction of the shaft 15 (body 13a) (hereinafter simply referred to as the radial direction).

The lubricant flows from the outer circumferential surface 13g of the body 13a to the inner circumferential surface 13c through the oil hole 13. The lubricant flowing into the inner circumferential surface 13c of the body 13a moves between the inner circumferential surface 13c and the shaft 15 along a circumferential direction of the shaft 15. The lubricant flowing into the inner circumferential surface 13c of the body 13a moves between the inner circumferential surface 13c and the shaft 15 along the axial direction of the shaft 15 (the left-to-right direction in FIG. 2). The lubricant is supplied to gaps between the shaft 15 and the two radial bearing surfaces 13d and 13e. Oil film pressure of the lubricant supports the shaft 15. The two radial bearing surfaces 13d and 13e receive the radial load of the shaft 15.

A through hole 13h is formed in the body 13a. The through hole 13h penetrates from the inner circumferential surface 13c to the to the outer circumferential surface 13g of the body 13a. The through hole 13h is disposed between the two radial bearing surfaces 13d and 13e. The through hole 13h is located opposite to the oil hole 13f in the body 13a. However, the position of the through hole 13h is not limited thereto, as long as being different from the position of the oil hole 13f in a circumferential direction of the body 13a.

A pin hole 3e is formed in the bearing housing 3. The pin hole 3e is formed in the bearing hole 3b at a position facing the through hole 13h. The pin hole 3e penetrates a wall defining the bearing hole 3b. The pin hole 3e connects an inner space with an outer space of the bearing hole 3b. A positioning pin 33 is inserted into the pin hole 3e.

In this embodiment, a positioning pin 33 is press-fitted into the pin hole 3e. A tip of the positioning pin 33 is inserted into the through hole 13h of the body 13a. The positioning pin 33 restricts movements of the body 13a in a rotational direction and the axial direction.

The shaft 15 includes a large diameter portion 15a, a medium diameter portion 15b, and a small diameter portion 15c. The large diameter portion 15a is located closer to the turbine impeller 17 (see FIG. 1) with respect to the body 13a. The large diameter portion 15a has a cylindrical shape. An outer diameter of the large diameter portion 15a is larger than an inner diameter of the inner circumferential surface 13c (radial bearing surface 13d) of the body 13a. The outer diameter of the large diameter portion 15a is larger than an outer diameter of the outer circumferential surface 13g of the body 13a. g of the body 13a. However, the outer diameter of the large diameter portion 15a may be equal to or smaller than the outer diameter of the outer circumferential surface 13g of the body 13a. The large diameter portion 15a axially faces the body 13a. The large diameter portion 15a has a constant outer diameter. However, the outer diameter of the large diameter portion 15a may not be constant.

The medium diameter portion 15b is located closer to the compressor impeller 19 (see FIG. 1) with respect to the large diameter portion 15a. The medium diameter portion 15b has a cylindrical shape. The medium diameter portion 15b is inserted into the insertion hole 13b of the body 13a. Therefore, the medium diameter portion 15b faces the inner circumference 13c of the insertion hole 13b in the radial direction. The medium diameter portion 15b has an outer diameter smaller than that of the large diameter portion 15a. The outer diameter of the medium diameter portion 15b is smaller than the inner diameter of the radial bearing surfaces 13d and 13e of the body 13a. The medium diameter portion 15b has a constant outer diameter. However, the outer diameter of the medium diameter portion 15b may not be constant.

The small diameter portion 15c is located closer to the compressor impeller 19 (see FIG. 1) with respect to the medium diameter portion 15b (the body 13a). The small diameter portion 15c has a cylindrical shape. The small diameter portion 15c has an outer diameter smaller than that of the medium diameter portion 15b. The small diameter portion 15c has a constant outer diameter. However, the outer diameter of the small diameter portion 15c may not be constant.

An annular oil thrower 35 is attached to the small diameter portion 15c. The oil thrower 35 scatters the lubricant flowing through the shaft 15 to the compressor impeller 19 radially outward. In other words, the oil thrower 35 curbs leakage of the lubricant to the compressor impeller 19.

The oil thrower 35 has an outer diameter larger than that of the medium diameter portion 15b. The outer diameter of the oil thrower 35 is larger than the inner diameter of the inner circumferential surface 13c (radial bearing surface 13e) of the body 13a. The outer diameter of the oil thrower 35 is smaller than the outer diameter of the outer circumferential surface 13g of the body 13a. However, the outer diameter of the oil thrower 35 may be equal to or larger than the outer diameter of the outer circumferential surface 13g of the body 13a. The oil thrower 35 axially faces the body 13a.

The body 13a is axially held by the oil thrower 35 and the large diameter portion 15a. The lubricant is supplied to a gap between the body 13a and the oil thrower 35. The lubricant is supplied to a gap between the body 13a and the large diameter portion 15a.

When the shaft 15 moves in the axial direction (the left side in FIG. 2), the oil thrower 35 supports an axial load with the oil film pressure of the lubricant between the body 13a and the oil thrower 35. When the shaft 15 moves in the axial direction (the right side in FIG. 2), the large-diameter portion 15a supports the axial load with the oil film pressure of the lubricant between the body 13a and the large diameter portion 15a. In other words, both ends of the body 13a in the axial direction are thrust bearing surfaces 13i and 13j receiving the thrust load.

Damper portions 13k and 13m are formed on the outer circumferential surface 13g of the body 13a. The damper portions 13k and 13m are axially spaced apart each other. The damper portions 13k and 13m are formed on the outer circumferential surface 13g at the both ends in the axial direction. The damper portions 13k and 13m have a diameter larger than that of other positions in the outer circumferential surface 13g. Gaps between the damper portions 13k and 13m and an inner circumferential surface 3f of the bearing hole 3b is supplied with the lubricant. Vibration of the shaft 15 is curbed by the oil film pressure of the lubricant.

Figure 3:
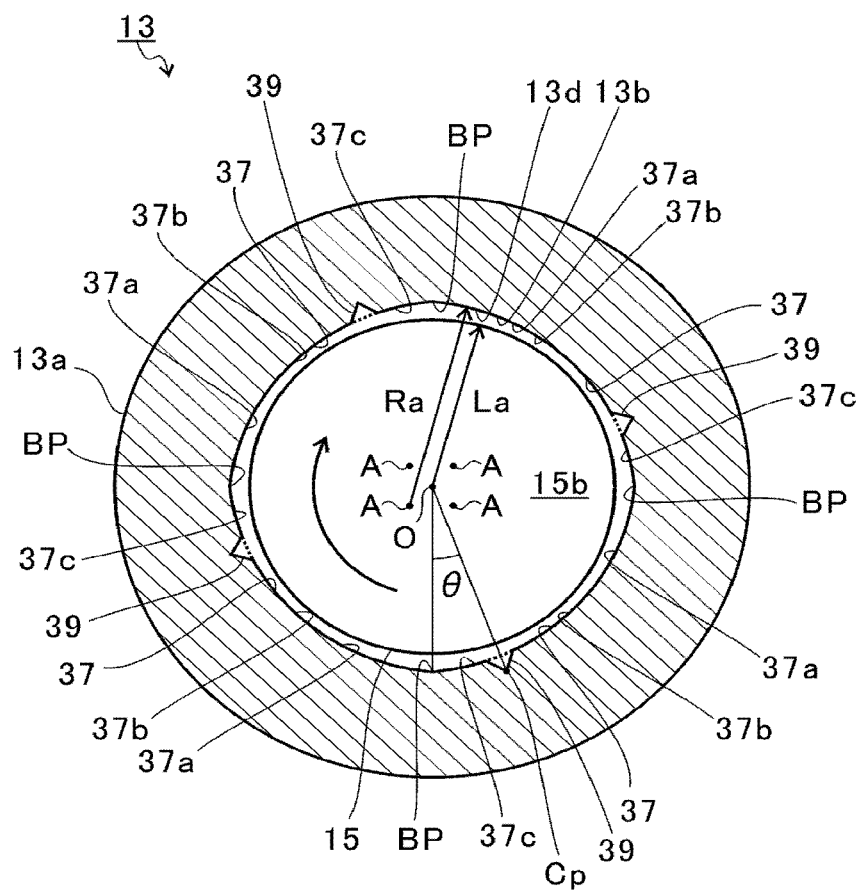
FIG. 3 is an illustration of a shape of a radial bearing surface according to an embodiment.

FIG. 3 is an illustration of a shape of the radial bearing surface 13d of the present embodiment. FIG. 3 is a cross-sectional view perpendicular to the axial direction of the shaft 15 (a cross-sectional view perpendicular to the central axis O of the insertion hole 13b) at a position where the radial bearing surface 13d is formed in the body 13a. 15. Hereinafter, the cross-sectional shape of the radial bearing surface 13d will be described. The radial bearing surface 13e has an approximately the same shape as that of the radial bearing surface 13d. Therefore, the description of the shape of the radial bearing surface 13e will be omitted.

As shown in FIG. 3, a plurality of arcuate surfaces 37 and a plurality of axial grooves 39 are formed on the radial bearing surface 13d. In the present embodiment, the radial bearing surface 13d includes four arcuate surfaces 37 and four axial grooves 39. However, the number of arcuate surfaces 37 and the number of axial grooves 39 are not limited thereto. For example, the number of arcuate surfaces 37 may be two, three, five, or six or more. The number of axial grooves 39 may be two, three, five, or six or more. The number of arcuate surfaces 37 is equal to the number of axial grooves 39. However, the number of the arcuate surfaces 37 and the number of the axial grooves 39 may be different from each other.

The arcuate surface 37 has a center of curvature A that is located inside the radial bearing surface 13d (insertion hole 13b). The center of curvature A of the arcuate surface 37 is at a different position from the central axis O of the insertion hole 13b (shaft 15). The centers of curvature A of the plurality of arcuate surfaces 37 are at different positions from each other. The centers of curvature A of the plurality of arcuate surfaces 37 are at positions that are radially spaced apart from the central axis O of the insertion hole 13b. The centers of curvature A of the plurality of arcuate surfaces 37 are located on the same circle around the central axis O. The centers of curvature A of the plurality of arcuate surfaces 37 are equally spaced apart from each other in the circumferential direction of the body 13a (hereinafter simply referred to as the circumferential direction).

A radius of curvature Ra of the plurality of arcuate surfaces 37 are equal to each other. The radius of curvature Ra of the arcuate surface 37 is larger than a radius La of the medium diameter portion 15b of the shaft 15. Therefore, the plurality of arcuate surfaces 37 are radially spaced apart from the shaft 15. However, the radius of curvature Ra of the plurality of arcuate surfaces 37 may be different from each other.

The arcuate surface 37 includes a reduction portion 37a, a middle portion 37b, and an enlargement portion 37c. The reduction portion 37a is located on a rear side of the arcuate surface 37 in a rotational direction of the shaft (a direction indicated by an arrow in FIG. 3). The middle portion 37b is located in the middle (center) of the arcuate surface 37 in the circumferential direction. The enlargement portion 37c is located on a forward side of the arcuate surface 37 in the rotational direction of the shaft 15.

In other words, the reduction portion 37a is located on a rear side with respect to the middle portion 3710 in the rotational direction of the shaft 15. The enlargement portion 37c is located on a forward side with respect to the middle portion 37b in the rotational direction of the shaft 15.

A distance between the central axis O and the middle portion 37b is the smallest among a distance between the central axis O and the arcuate surface 37. A distance between the central axis O and the reduction portion 37a is larger than the distance between the central axis O and the middle portion 37b. The distance between the central axis O and the reduction portion 37a increases as moving rearward in the rotational direction of the shaft 15. A distance between the central axis O and the enlargement portion 37c is larger than the distance between the central axis O and the middle portion 37b. The distance between the central axis O and the enlargement portion 37c decreases as moving rearward in the rotational direction of the shaft 15.

The plurality of arcuate surfaces 37 are arranged adjacent to each other in the circumferential direction of the body 13a (the radial bearing surface 13d). A boundary portion BP is formed between two adjacent arcuate surfaces 37. The boundary portion BP is a connecting part (a continuous part) between a forward edge of the enlargement portion 37c in the rotational direction and a rear edge of the reduction portion 37a in the rotational direction, between two adjacent arcuate surfaces 37. A distance between the central axis O and the boundary portion BP is the largest among the distance between the central axis O and the arcuate surface 37.

As shown in FIG. 3, the shaft 15 is the closest to the middle portion 37b among the radial bearing surface 13d. The distance between the shaft 15 and the reduction portion 37a decreases as moving forward in the rotational direction of the shaft 15.

The lubricant between the shaft 15 and the radial bearing surface 13d moves in the rotational direction of the shaft 15, as the shaft 15 rotates. In this state, the lubricant is compressed as moving from the reduction portion 37a to the middle portion 37b. The compressed lubricant presses the shaft 15 radially inward (in the radial direction) (wedge effect). As a result, the radial load is supported.

The plurality (four in the present embodiment) of reduction portions 37a and middle portions 37b are formed on the radial bearing surface 13d. The plurality of reduction portions 37a and middle portions 37b are arranged at equal intervals in the circumferential direction of the radial bearing surface 13d. The shaft 15 is pressed radially inward by the plurality of reduction portions 37a and middle portions 37b. The shaft 15 is pressed inward in the radial direction by the plurality of reduction portions 37a and middle portions 37b. As a result, the shaft 15 is stably supported by the semi-floating bearing 13.

As described above, the semi-floating bearing 13 of this embodiment is configured as a multi-lobe bearing comprising the plurality of arcuate surfaces 37. The multi-lobe bearing can improve the stability of support of the shaft 15.

The axial groove 39 extends in the axial direction of the shaft 15. The axial groove 39 has a triangular shape in the cross-section perpendicular to the axial direction. However, the axial groove 39 is not limited thereto, and may have a rectangular, semicircular, or polygonal shape in the cross-section perpendicular to the axial direction.

The axial groove 39 extends on the radial bearing surface 13d from an end where the two radial bearing surfaces 13d and 13e (see FIG. 2) are close to each other, to an end where the two radial bearing surfaces 13d and 13e are spaced apart from each other. The axial groove 39 is opened on the thrust bearing surface 13i (i.e., the axial end face of the body 13a). The lubricant passes through the axial groove 39. The axial groove 39 supplies the lubricant to the radial bearing surface 13d. The axial groove 39 supplies the lubricant to the thrust bearing surface 13i.

The axial groove 39 is formed on the enlargement portion 37c in the radial bearing surface 13d. In other words, the axial groove 39 is formed at a position spaced apart rearwardly from the boundary portion BP in the rotational direction of the shaft 15. The axial groove 39 is formed at a position spaced apart from the middle portion 37b forwardly n the rotational direction of the shaft 15. In FIG. 3, an imaginary surface of the arcuate surface 37 extended inside the axial groove 39 is shown by a dashed line.

Specifically, the axial groove 39 is disposed at a position where its center position Cp in the circumferential direction is spaced apart rearwardly from the boundary portion BP in the rotational direction of the shaft 15. The center position Cp of the axial groove 39 in the circumferential direction is disposed within an area from the boundary portion BP to the middle portion (a central position) 37b.

In this embodiment, a forward end of the axial groove 39 in the rotational direction of the shaft 15 (the portion continuous with the arcuate surface 37) is located rearward with respect to the boundary portion BP in the rotational direction of the shaft 15. In other words, the arcuate surface 37 is disposed between the forward end of the axial groove 39 in the rotational direction of the shaft 15 and the boundary portion BP. A rearward end of the axial groove 39 in the rotational direction of the shaft 15 (the portion continuous with the arcuate surface 37) is located forward with respect to the middle portion 37b in the rotational direction of the shaft 15. In other words, the arcuate surface 37 is disposed between the rearward end of the axial groove 39 in the rotational direction of the shaft 15 and the middle portion 37b. That is, the axial groove 39 is spaced apart from the boundary portion BP and the middle portion 37b. The axial groove 39 is disposed at a position keeping away from the boundary portion BP and the middle portion 37b.

In the present disclosure, an angle between a line connecting the central axis O of the insertion hole 13b and the boundary portion BP, and a line connecting the central axis O and the center position Cp of the axial groove 39 is defined as a rotational angle θ. The axial groove 39 is formed within an area where the center position Cp in the circumferential direction is positioned rearward by the rotational angle that is less than 22.5 degrees with respect to the boundary portion BP, in the rotational direction. Preferably, the axial groove 39 is formed within an area where the center position Cp in the circumferential direction is positioned rearward by the rotational angle of 15 degrees to 20 degrees with respect to the boundary portion BP, in the rotational direction.

Figure 4:
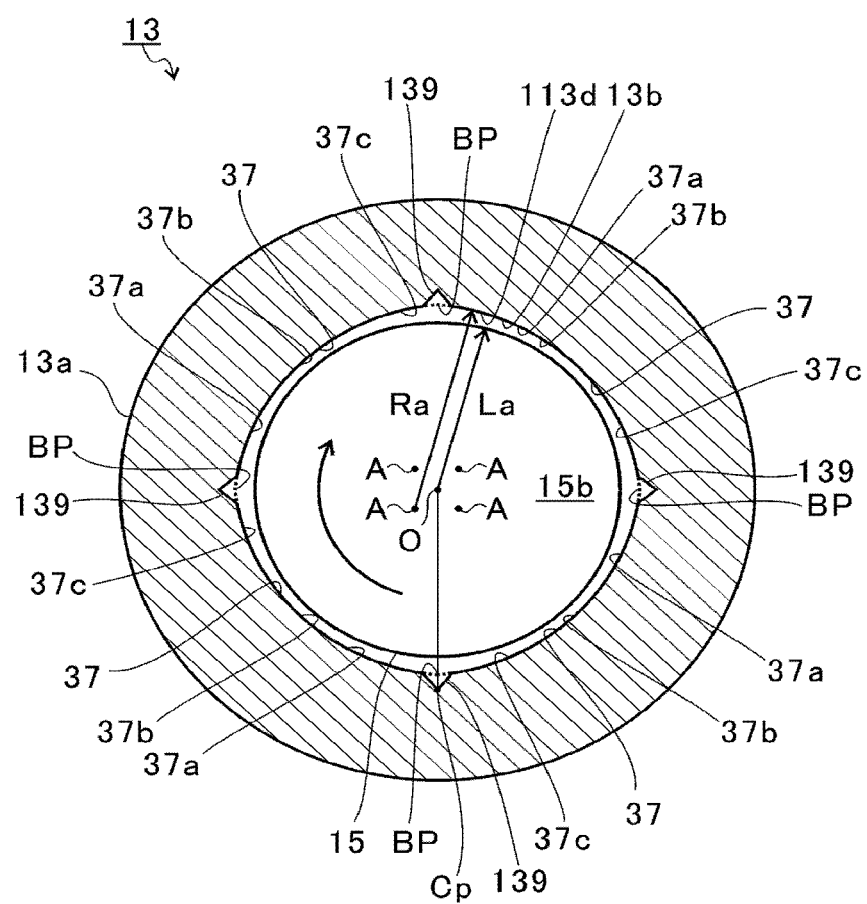
FIG. 4 is an illustration of a shape of a radial bearing surface according to a comparative example.

FIG. 4 is an illustration of a shape of a radial bearing surface 113d of a comparative example. Components substantially equal to those described above are assigned with the same reference signs, and the explanations thereof are omitted. The radial bearing surface 113d of the comparative example is different from the radial bearing surface 13d described above only in the position of the axial groove 139.

In FIG. 4, an imaginary surface of the arcuate surface 37 extended inside the axial groove 139 is shown by a dashed line. As shown in FIG. 4, the axial groove 139 is formed in the radial bearing surface 113d at the boundary portion BP. Specifically, the center position Cp of the axial groove 139 in the circumferential direction is located at the boundary portion BP.

Figure 5:
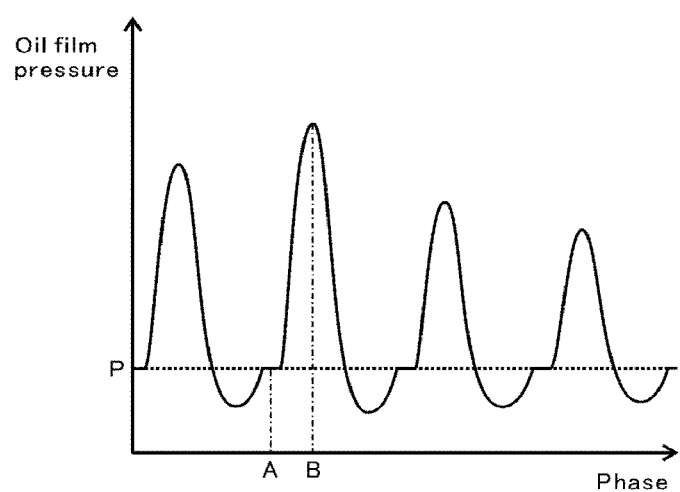
FIG. 5 shows oil film pressure distribution between the radial bearing surface and a shaft in the comparative example.

FIG. 5 shows oil film pressure distribution between the radial bearing surface 113d and the shaft 15 in the comparative example. In FIG. 5, the vertical axis indicates oil film pressure of the lubricant, and the horizontal axis indicates a phase in the radial bearing surface 113d in the circumferential direction. Oil film pressure P indicates the oil film pressure in the axial groove 139. A phase A indicates a phase of the boundary portion BP in the radial bearing surface 113d (i.e., the phase of the axial groove 139 of the comparative example). A phase B indicates a predetermined phase in the reduction portion 37a in the radial bearing surface 113d.

The center position Cp of the axial groove 139 in the circumferential direction is located at the boundary portion BP. Accordingly, a half of the axial groove 139 is located forward with respect to the boundary portion BP in the rotational direction of the shaft 15 (see FIG. 4). In other words, the half of the axial groove 139 overlaps with the reduction portion 37a. This makes the oil film pressure in the axial groove 139 susceptible to the oil film pressure at the reduction portion 37a. As shown in FIG. 5, the oil film pressure P at the phase A (the axial groove 139) is continuous with the oil film pressure on the way up to the phase B (reduction portion 37a). Due to the influence of the oil film pressure at the reduction portion 37a, the oil film pressure in the axial groove 139 is likely to rise.

As the oil film pressure in the axial groove 139 increases, the lubricant is less likely to distribute through the axial groove 139. As a result, the axial groove 139 limits the amount of lubricant supplied to the radial bearing surface 113d. The axial groove 139 limits the amount of lubricant supplied to the thrust bearing surface 13i of the body 13a. As a result, the amount of lubricant required for the radial bearing surface 113d and the thrust bearing surface 13i may be insufficient.

Figure 6:
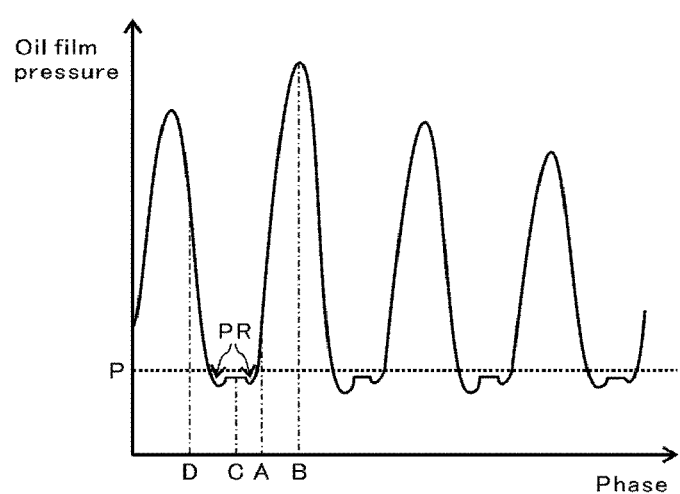
FIG. 6 shows oil film pressure distribution between the radial bearing surface and a shaft in the embodiment.

FIG. 6 shows oil film pressure distribution between the radial bearing surface 13d and the shaft 15 in the present embodiment. In FIG. 6, the vertical axis indicates oil film pressure of the lubricant, and the horizontal axis indicates a phase in the radial bearing surface 13d in the circumferential direction. A phase C is a phase positioned rearward with respect to the phase A (i.e., the boundary portion BP) in the rotational direction of the shaft 15. The phase C is a phase where the axial groove 39 of the present embodiment is formed. FIG. 6 indicates an example in which the center position Cp of the axial groove 39 in the circumferential direction is formed in an area where the rotational angle is 15 degrees to 20 degrees rearward with respect to the boundary portion BP in the rotational direction. A phase D indicates a phase of the middle portion 37b of the radial bearing surface 13d.

As shown in FIG. 6, a pressure reduction part PR is formed between the oil film pressure at the phase C (the axial groove 39) and the oil film pressure at the phase B (the reduction portion 37 a). The pressure reduction part PR is formed between the oil film pressure at the phase C (the axial groove 39) and the oil film pressure at the phase D (the middle portion 37b). The oil film pressure at the pressure reduction part PR is smaller than the oil film pressure at the phase C.

When the axial groove 39 is formed on the radial bearing surface 13d, the lubricant moving in the rotational direction of the shaft 15 hits the inner wall (an inner surface) of the axial groove 39. When the lubricant hits the inner wall of the axial groove 39, the oil film pressure in the axial groove 39 increases. Therefore, in FIG. 6, the oil film pressure at the phase C is higher than that at the pressure reduction part PR. As shown in FIG. 4, when the half of the axial groove 139 overlaps with the reduction portion 37a, the oil film pressure is affected by the reduction portion 37a where the oil film pressure is increased, and the effect of the pressure increase is larger.

In contrast, in the present embodiment, the axial groove 39 is formed in the enlargement portion 37c (see FIG. 3). In other words, the axial groove 39 is located at a position spaced apart from the reduction portion 37a with respect to the boundary portion BP. The axial groove 39 is located at a position spaced apart from the reduction portion 37a with respect to the middle portion 37b. As a result, the oil film pressure in the axial groove 39 is not affected by the oil film pressure at the reduction portion 37a and the middle portion 37b. As such, the oil film pressure in the axial groove 39 is less likely to be affected by the oil film pressure at the reduction portion 37a and the middle portion 37b, and is smaller than the oil film pressure P in the axial groove 139.

As the oil film pressure in the axial groove 39 decreases, the lubricant is more easily distributed in the axial groove 39. In other words, the amount of lubricant supplied by the axial groove 39 to the radial bearing surface 13d is less restrictive. The amount of lubricant supplied by the axial groove 39 to the radial bearing surface 13i is less restrictive. Accordingly, the axial groove 39 can supply the necessary amount of lubricant to the radial bearing surface 13d and the thrust bearing surface 13i. As a result, a shortage of the lubricant required for the radial bearing surface 13d and the thrust bearing surface 13i can be prevented.

As described above, the semi-floating bearing 13 of this embodiment includes the axial groove 39. The axial groove 39 is formed at a position where its center position Cp in the circumferential direction is spaced apart rearwardly from the boundary portion BP in the rotational direction of the shaft 15. This allows the axial groove 39 to be less affected by the oil film pressure at the reduction portion 37a. Therefore, the distribution of the lubricant in the axial groove 39 can be facilitated. As a result, it is possible to prevent a shortage of the lubricant required for the radial bearing surface 13d and the thrust bearing surface 13i.

However, if the axial groove 39 is moved rearwardly with respect to the boundary portion BP in the rotational direction, the axial groove 39 is closer to the middle portion 37b. The lubricant compressed by the reduction portion 37a is led to the middle portion 37b. Therefore, the oil film pressure at the middle portion 37b approximates the oil film pressure at the reduction portion 37a.

Therefore, the axial groove 39 is positioned in the area where its center position Cp in the circumferential direction is spaced apart rearwardly from the boundary portion BP by the rotational angle of less than 22.5 degrees in the rotational direction. If the rotational angle is 22.5 degrees or more, the axial groove 39 is closer to the middle portion 37b with respect to the boundary portion BP. Therefore, the axial groove 39 is susceptible to the oil film pressure of the middle portion 37b in the area where the rotational angle is 22.5 degrees or more. It is possible to reduce the influence of the oil film pressure at the middle portion 37b by positioning the axial groove 39 in the area where the rotational angle is less than 22.5 degrees. In other words, the axial groove 39 is preferably positioned in the area where its center position Cp in the circumferential direction is closer to the boundary portion BP with respect to an intermediate position between the boundary portion BP and the middle portion 37b.

More preferably, the axial groove 39 is positioned in the area where its center position Cp in the circumferential direction is spaced apart rearwardly from the boundary portion BP by the rotational angle of 15 degrees to 20 degrees in the rotational direction. As shown in FIG. 6, this makes the axial groove 39 less susceptible to the oil film pressure at both the reduction portion 37a (phase B) and the middle portion 37b (phase D).

The axial groove 39 is preferably formed spaced apart from the boundary portion BP and the middle portion 37b. It is possible to reduce the influence of the oil film pressure at the reduction portion 37a and the middle portion 37b by spacing the axial groove 39 apart from both the reduction portion 37a and the middle portion 37b.

Figure 7:
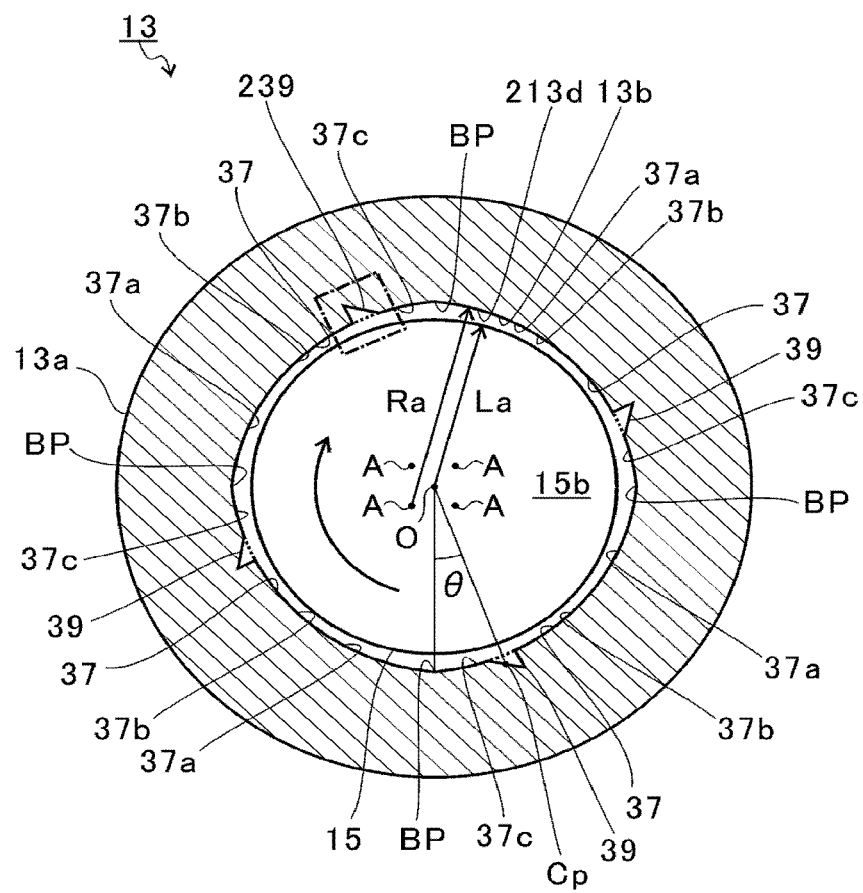
FIG. 7 is an illustration of a shape of an axial groove of a variation.

FIG. 7 is an illustration of a shape of an axial groove 239 of a variation. FIG. 7 is a cross-sectional view perpendicular to the axial direction of the shaft 15 at a position where the radial bearing surface 213d is formed in the body 13a of the variation. Components substantially equal to those of the above embodiment are assigned with the same reference signs, and the explanations thereof are omitted. The radial bearing surface 213d of the variation is different from the radial bearing surface 13d of the above embodiment only in the shape of the axial groove 239.

As shown in FIG. 7, a plurality of arcuate surfaces 37 and a plurality of axial grooves 239 are formed on the radial bearing surface 213d. In this variation, the radial bearing surface 213d includes four arcuate surfaces 37 and four axial grooves 239. Similar to the above embodiment, the semi-floating bearing 13 of this variation is configured as the multi-lobe bearing including the plurality of arcuate surfaces 37.

The axial groove 239 extends in the axial direction of the shaft 15. The axial groove 239 has a triangular shape in the cross-section perpendicular to the axial direction. The axial groove 239 extends on the radial bearing surface 213d from an end where the two radial bearing surfaces 13d and 13e (see FIG. 2) are close to each other, to an end where the two radial bearing surfaces 13d and 13e (see FIG. 2) are spaced apart from each other. The axial groove 239 is opened on the thrust bearing surface 13i (see FIG. 2).

The axial groove 239 is formed in the enlargement portion 37c of the radial bearing surface 213d. In other words, the axial groove 239 is formed at a position spaced apart rearwardly from the boundary portion BP in the rotational direction of the shaft 15.

Specifically, the axial groove 239 is formed at a position where its center position Cp in the circumferential direction is spaced apart rearwardly from the boundary portion BP in the rotational direction of the shaft 15. The center position Cp of the axial groove 239 in the circumferential direction is disposed within an area from the boundary portion BP to the middle portion (a central position) 37b.

In this variation, the axial groove 239 is spaced apart from the boundary portion BP and the middle portion 37b. In other words, the axial groove 239 is disposed at a position keeping away from the boundary portion BP and the middle portion 37b.

The axial groove 239 is formed in an area where its center position Cp in the circumferential direction is spaced apart rearwardly from the boundary portion BP by the rotational angle of less than 22.5 degrees in the rotational direction. Preferably, the axial groove 239 is formed in an area where its center position Cp in the circumferential direction is spaced apart rearwardly from the boundary portion BP by the rotational angle of 15 degrees to 20 degrees in the rotational direction.

Figure 8:
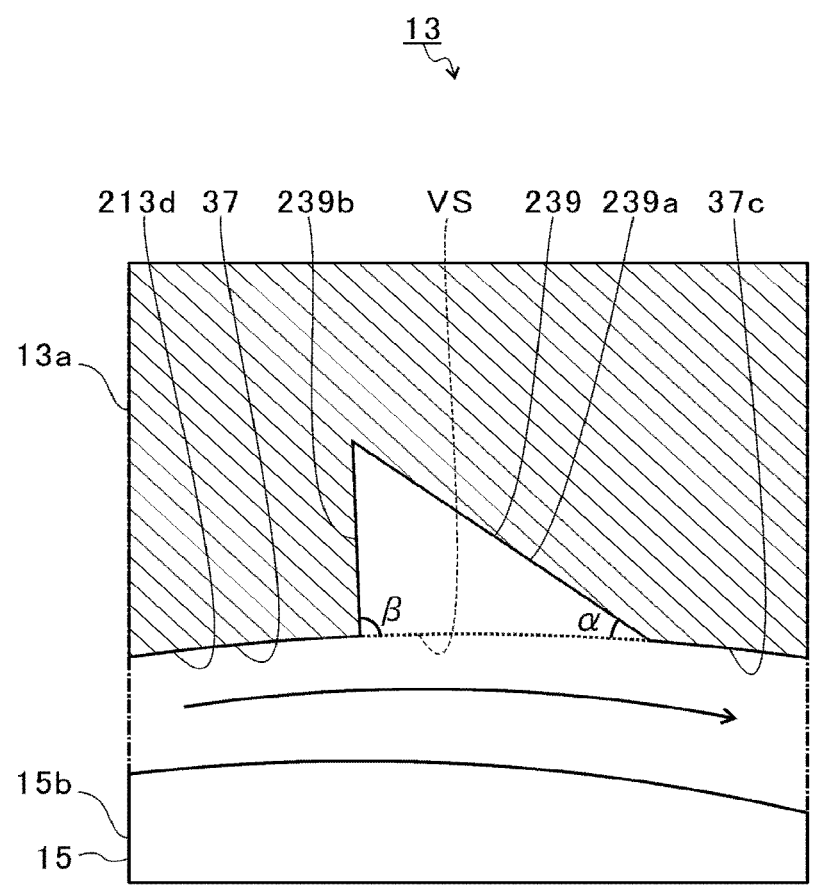
FIG. 8 is a schematic enlarged view of an area enclosed by dashed dotted lines in FIG. 7.

FIG. 8 is a schematic enlarged view of an area enclosed by dashed dotted lines in FIG. 7. As shown in FIG. 8, the axial groove 239 includes a forward face 239a and a rearward face 239b. The forward face 239a is a lateral surface formed at a position forward in the rotational direction of the shaft 15 (a direction indicated by the arrow in FIG. 8), in the axial groove 239. The rearward face 239b is a lateral surface formed at a position rearward in the rotational direction of the shaft 15, in the axial groove 239.

In FIG. 8, an imaginary surface VS of the arcuate surface 37 extended inside the axial groove 239 is shown by a dashed line. An angle $\alpha$ between the imaginary surface VS and the forward face 239a is smaller than an angle $\beta$ between the imaginary surface VS and the rearward face 239b. In this variation, the angle $\alpha$ is, for example, 30 degrees, and the angle $\beta$ is, for example, 90 degrees. However, the values of the angles $\alpha$ and $\beta$ are not limited thereto, as long as the angle $\alpha$ is smaller than the angle $\beta$.

In this variation, the forward face 239a and the rearward face 239b have a planar shape. However, the forward face 239a and the rearward face 239b are not limited thereto, and may have a curved-surface shape. In this case, the angle $\alpha$ is an angle between a tangent of the forward face 239a at an edge continuous with (connected to) the arcuate surface 37 and the imaginary surface VS. The angle is an angle between a tangent of the rearward face 239b at an edge continuous with the arcuate surface 37 and the imaginary surface VS. In other words, the angle $\alpha$ between the tangent of the forward face 239a at the edge continuous with the arcuate surface 37 and the imaginary surface VS is smaller than the angle $\beta$ between the tangent of the rearward face 239b at the edge continuous with the arcuate surface 37 and the imaginary surface VS.

The lubricant between the radial bearing surface 213d and the shaft 15 moves in the rotational direction of the shaft 15. The lubricant moving in the rotational direction of the shaft 15 contacts the forward face 239a of the axial groove 39. The lubricant is blocked by the forward face 239a. In this state, the dynamic pressure of the lubricant is converted into a static pressure. As a result, the pressure of the lubricant in the axial groove 239 increases.

The forward face 239a is likely to block the lubricant as the angle $\alpha$ between the forward face 239a and the imaginary surface VS increases. In contrast, the forward face 239a is less likely to block the lubricant as the angle $\alpha$ between the forward face 239a and the imaginary surface VS decreases. In other words, the pressure of the lubricant in the axial groove 239 is likely to increase as the angle $\alpha$ increases. The pressure of the lubricant in the axial groove 239 is less likely to increase as the angle $\alpha$ decreases.

In this variation, the angle $\alpha$ is smaller than the angle $\beta$. Therefore, the axial groove 239 can curb an increase of the pressure of the lubricant, compared to the case where the angle $\alpha$ is greater than the angle $\beta$. Accordingly, the distribution of the lubricant in the axial groove 239 can be facilitated. As a result, it is possible to avoid the shortage of the lubricant required for the radial bearing surface 13d and the thrust bearing surface 13i.

Although the embodiments of the present disclosure have been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

In the above embodiment and the variation, the examples are described in which the axial groove 39, 239 is spaced apart from the middle portion 37*b* and the boundary portion BP. However, the present disclosure is not limited thereto, and a part of the axial groove 39, 239 may be disposed within the middle portion 37*b* or at the boundary portion BP, as long as the center position Cp in the circumferential direction is spaced apart rearwardly from the boundary portion BP in the rotational direction.

In the above embodiment and the variation, the examples are described in which the center position Cp of the axial groove 39, 239 is located in the area less than 22.5 degrees from the boundary portion BP rearwardly in the rotational direction. However, the above area is not limited thereto, and may vary depending on the number of arcuate surfaces 37 formed on the radial bearing surface 13*d*, 213*d*. For example, if the number of arcuate surfaces 37 is two, the above area may be less than 45 degrees. If the number of arcuate surfaces 37 is three, the above area may be less than 30 degrees. If the number of arcuate surfaces 37 is five, the above area may be less than 18 degrees. If the number of arcuate surfaces 37 is six, the above area may be 15 degrees.

In the above embodiment and the variation, the examples are described in which the center position Cp of the axial groove 39, 239 is located in the area 15 degrees to 20 degrees from the boundary portion BP rearwardly in the rotational direction. However, the above area is not limited thereto, and may vary depending on the number of arcuate surfaces 37 formed on the radial bearing surface 13*d*, 213*d*. For example, if the number of arcuate surfaces 37 is two, the above area may be 30 degrees to 40 degrees. If the number of arcuate surfaces 37 is three, the above area may be 20 degrees to 26.6 degrees. If the number of arcuate surfaces 37 is five, the above area may be 12 degrees to 16 degrees. If the number of arcuate surfaces 37 is six, the above area may be 10 degrees to 13.3 degrees.

In the above embodiment and the variation, the examples are described in which the multi-lobe bearing is the semi-floating bearing 13. However, the multi-lobe bearing is not limited thereto, and may be a full-floating bearing.

What is claimed is:

1. A multi-lobe bearing comprising:
   an annular body through which a shaft is inserted;
   a radial bearing surface that is formed on an inner circumferential surface of the body, and that includes a plurality of arcuate surfaces including mutually different centers of curvature and arranged adjacent to each other in a circumferential direction of the body; and
   axial grooves formed in the radial bearing surface and extending in an axial direction of the shaft, a center position of the axial groove in the circumferential direction being located at a position spaced apart rearwardly from a boundary portion between the plurality of arcuate surfaces in a rotational direction of the shaft within an area from the boundary portion to a central position of an arcuate surface of the plurality of arcuate surfaces in the circumferential direction,
   wherein the axial groove is spaced apart from the central position and the boundary portion.

2. The multi-lobe bearing according to claim 1,
   wherein the radial bearing surface includes four arcuate surfaces, and
   the center position of the axial groove is formed within an area that is less than 22.5 degrees from the boundary portion rearwardly in a rotational angle in the rotational direction.

3. The multi-lobe bearing according to claim 1,
   wherein the axial groove includes a forward face formed at a position forward in the rotational direction of the shaft, and a rearward face formed at a position rearward in the rotational direction, and
   an angle between a tangent of the forward face at an edge continuous with the arcuate surface and an imaginary surface of the arcuate surface extended inwardly in the axial groove is smaller than an angle between a tangent of the rearward face at an edge continuous with the arcuate surface and the imaginary surface.

4. The multi-lobe bearing according to claim 2,
   Wherein the axial groove includes a forward face formed at a position forward in the rotational direction of the shaft, and a rearward face formed at a position rearward in the rotational direction, and
   an angle between a tangent of the forward face at an edge continuous with the arcuate surface and an imaginary surface of the arcuate surface extended inwardly in the axial groove is smaller than an angle between a tangent of the rearward face at an edge continuous with the arcuate surface and the imaginary surface.

5. The multi-lobe bearing according to claim 1, comprising a thrust bearing surface formed on an end face of the body in the axial direction, wherein the axial groove is opened on the thrust bearing surface.

6. The multi-lobe bearing according to claim 2, comprising a thrust bearing surface formed on an end face of the body in the axial direction, wherein the axial groove is opened on the thrust bearing surface.

7. The multi-lobe bearing according to claim 3, comprising a thrust bearing surface formed on an end face of the body in the axial direction, wherein the axial groove is opened on the thrust bearing surface.

8. The multi-lobe bearing according to claim 4, comprising a thrust bearing surface formed on an end face of the body in the axial direction, wherein the axial groove is opened on the thrust bearing surface.

9. A turbocharger comprising a multi-lobe bearing according to claim 1.

* * * * *